W. P. EARNHEART.
SIGNAL DEVICE FOR VEHICLES.
APPLICATION FILED FEB. 27, 1914.

1,183,546.

Patented May 16, 1916.

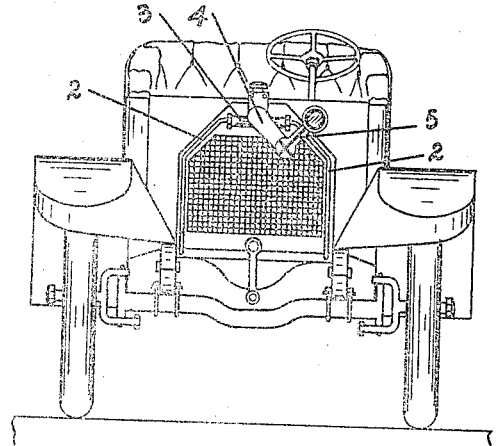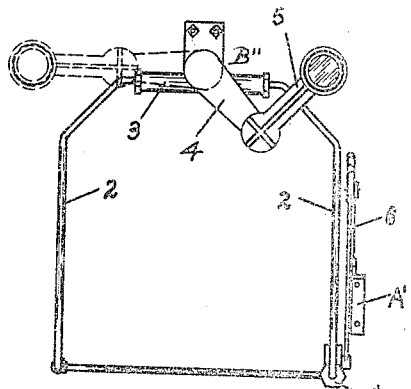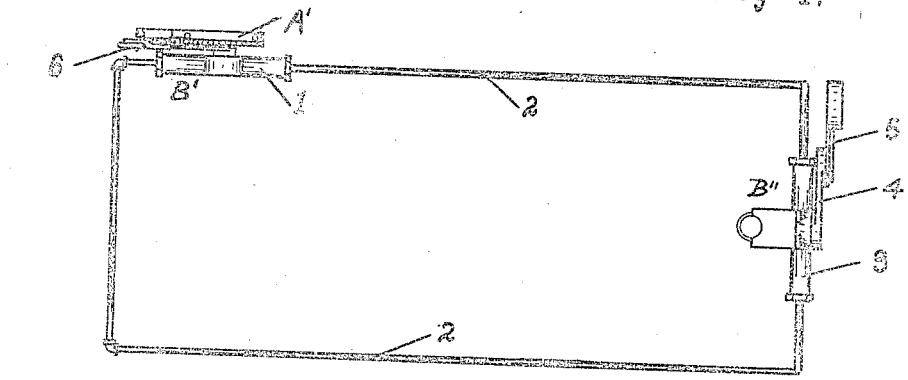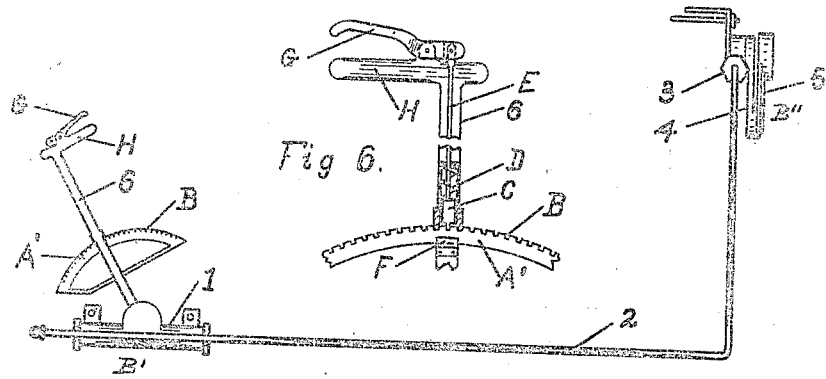

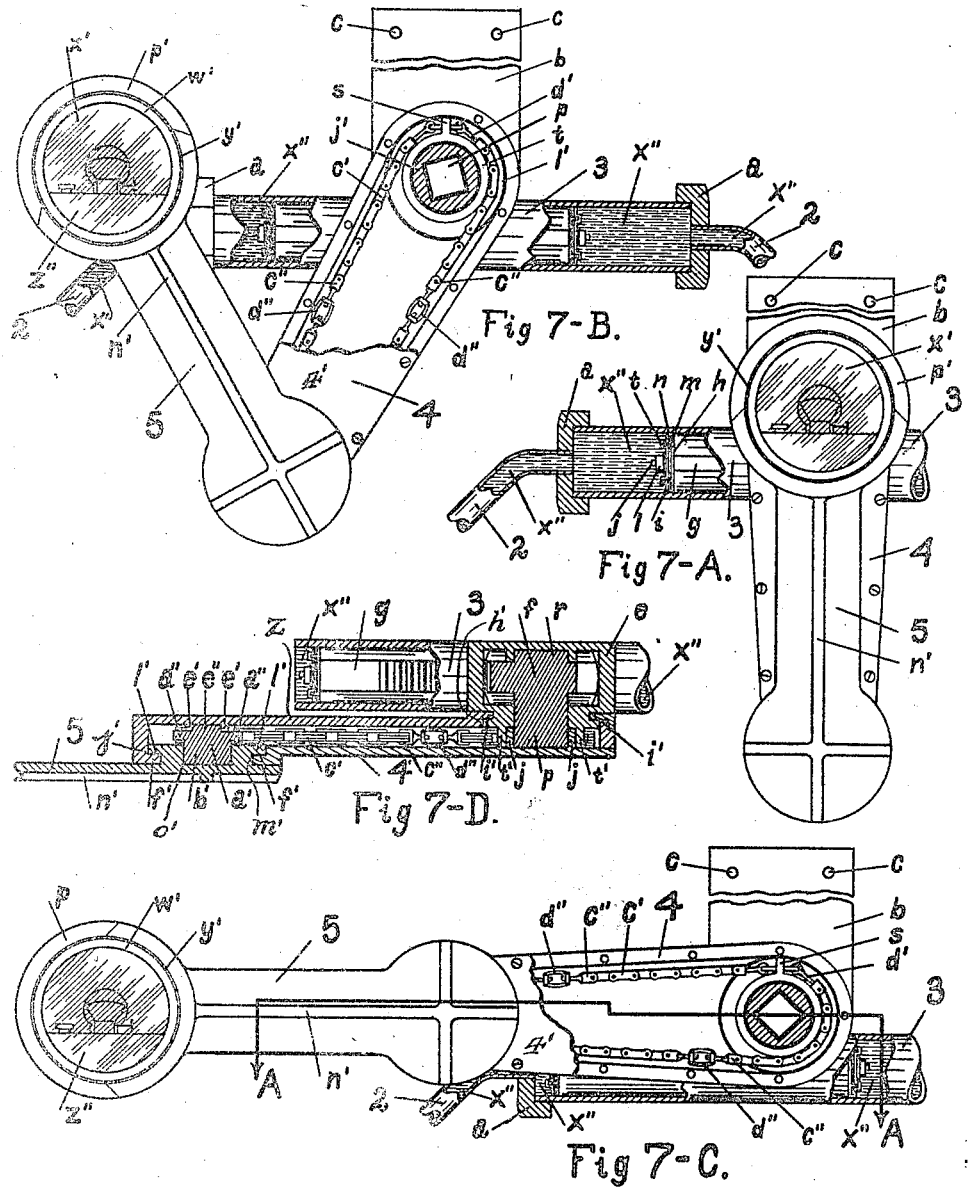

W. P. EARNHEART.
SIGNAL DEVICE FOR VEHICLES.
APPLICATION FILED FEB. 27, 1914.
1,183,546.
Patented May 16, 1916.
7 SHEETS—SHEET 4.
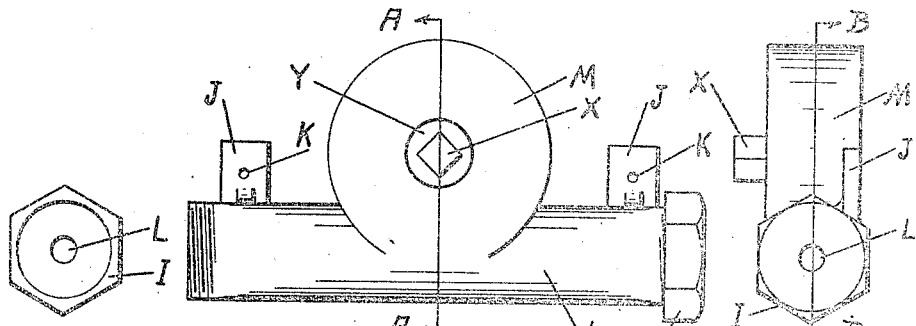
Fig 8.   Fig 9.   Fig 10.
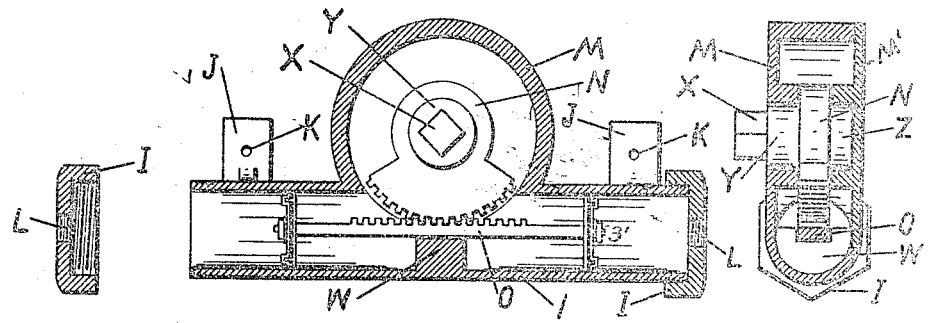
Fig 11.   Fig 12.   Fig 13.
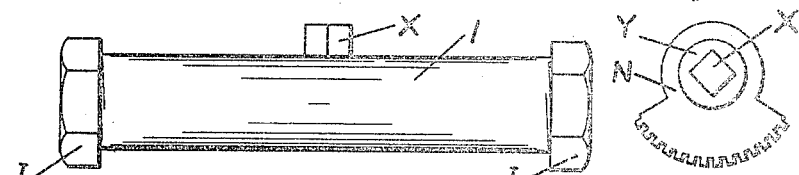
Fig 14.   Fig 12-A.
Fig 15.   Fig 12-B.
WITNESSES:   INVENTOR.
   William P. Earnheart,
   BY
   J. M. Cooke
   ATTORNEY.

W. P. EARNHEART.
SIGNAL DEVICE FOR VEHICLES.
APPLICATION FILED FEB. 27, 1914.

1,183,546.

Patented May 16, 1916
7 SHEETS—SHEET 6.

WITNESSES:

INVENTOR.

ATTORNEY.

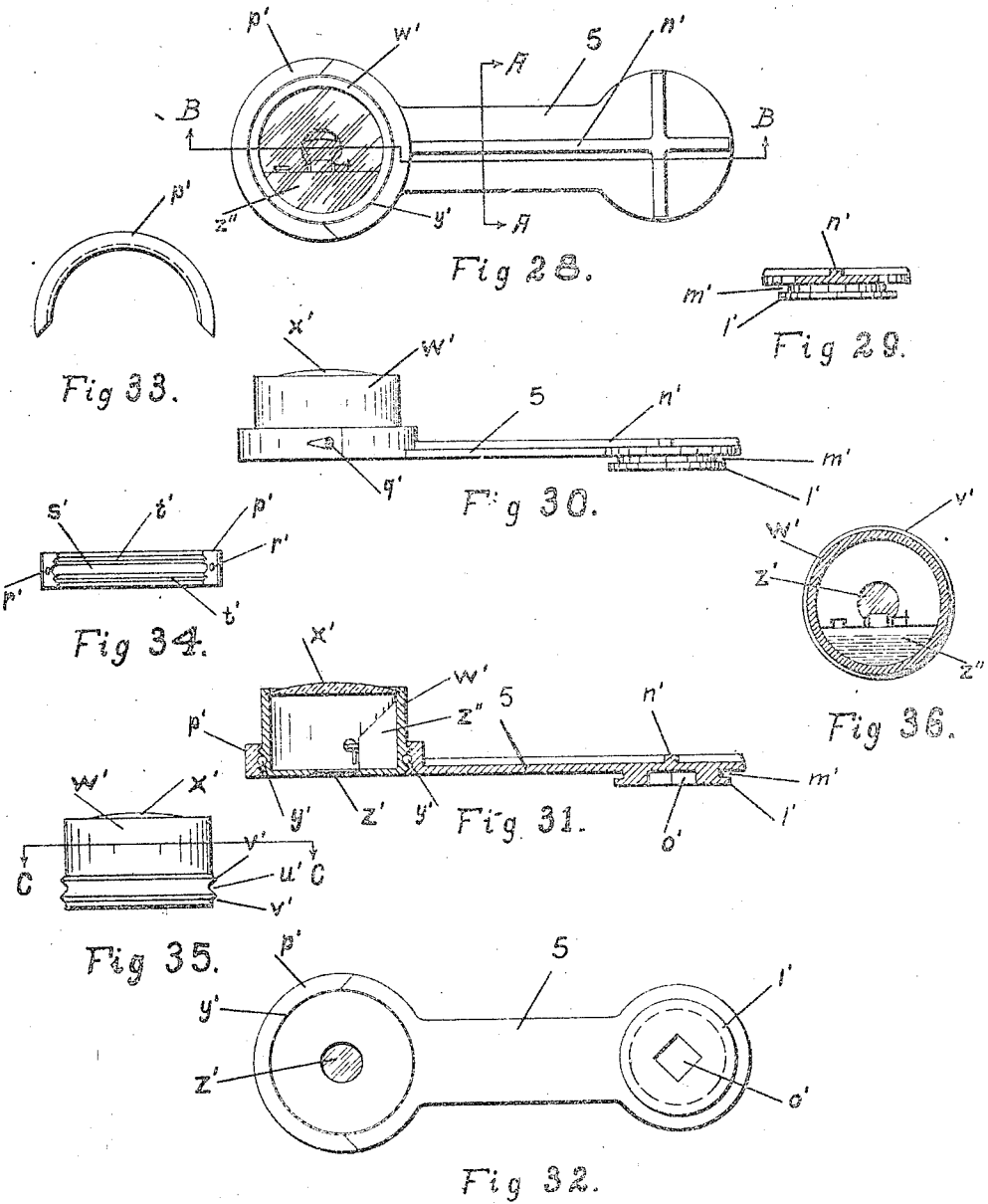

UNITED STATES PATENT OFFICE.

WILLIAM P. EARNHEART, OF INDIANAPOLIS, INDIANA, ASSIGNOR TO SAFETY FIRST DEVICES COMPANY, OF INDIANAPOLIS, INDIANA, A CORPORATION.

SIGNAL DEVICE FOR VEHICLES.

1,183,546.      Specification of Letters Patent.      Patented May 16, 1916.

Application filed February 27, 1914. Serial No. 821,418.

*To all whom it may concern:*

Be it known that I, WILLIAM P. EARN-HEART, a citizen of the United States, and a resident of Indianapolis, in the county of Marion and State of Indiana, have invented a new and useful Improvement in Signal Devices for Vehicles; and I do hereby declare the following to be a full, clear, and exact description thereof.

My invention relates to a signaling device for vehicles, and has special reference to fast moving vehicles, such as automobiles, motor trucks, etc.

The object of my invention is to provide a cheap, simple and efficient signaling device for vehicles, which will add to the safety of the people upon the streets, will economize upon the time of the driver of a vehicle and will assist traffic corner-men on the streets in avoiding congestion of traffic through the driver of the vehicle indicating to such persons, vehicles and others at some distance from him the direction he intends to take at the next intersecting street or crossing.

To these ends my invention consists, generally stated, in the novel arrangement, construction and combination of parts, as hereinafter more specifically set forth and described and particularly pointed out in the claims.

To enable others skilled in the art to which my invention appertains to construct and use my improved signaling device for vehicles, I will describe the same more fully, referring to the accompanying drawings, in which:—

Figure 1:
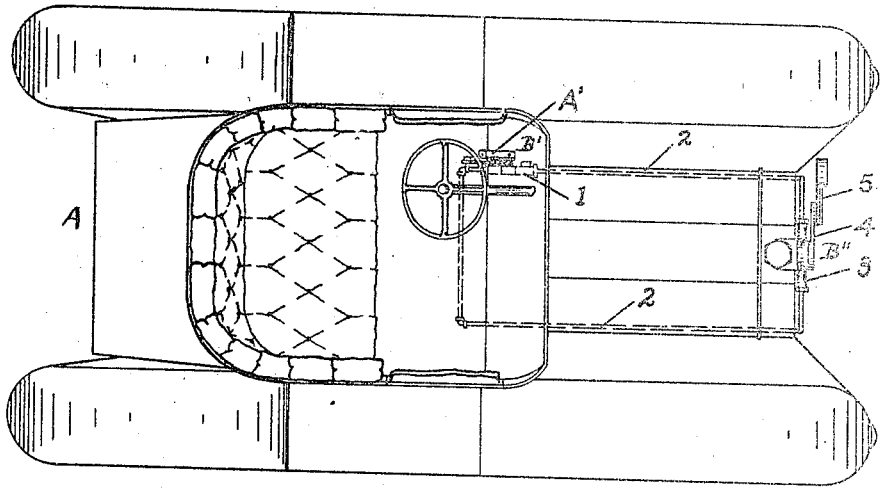
Figure 2:
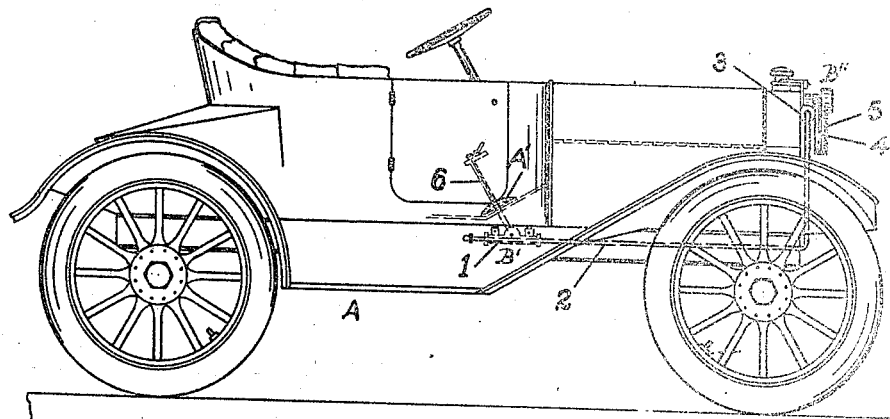
Figure 24:
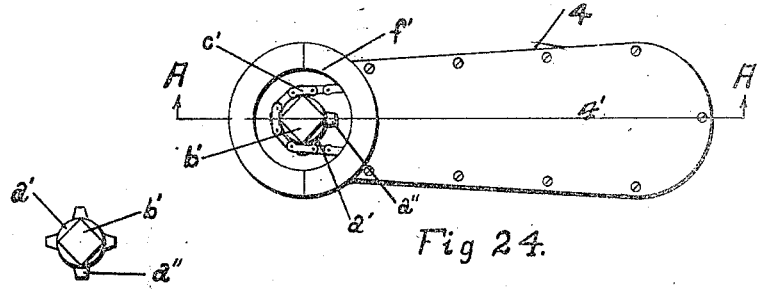
Figure 25:
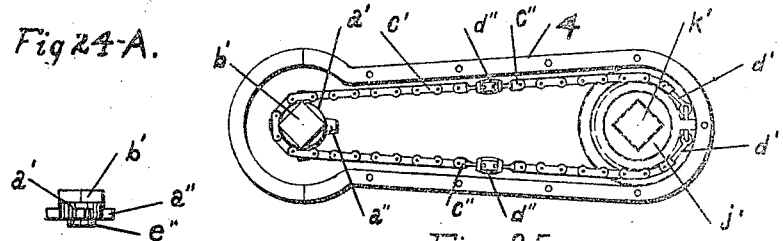
Figure 26:
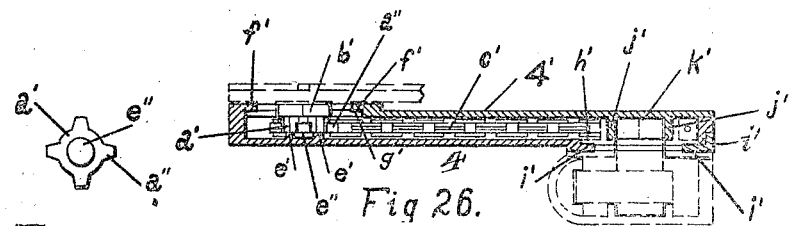
Figure 27:
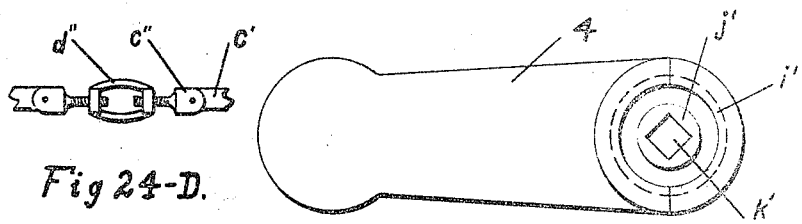

Figure 1 is a top view of an ordinary automobile having my improved signaling device applied thereto. Fig. 2 is a side view of the same. Fig. 3 is a front view of the same. Figs. 4 and 5 are front and top views respectively of the device detached from the automobile. Fig. 6 is a side view of the operating lever. Fig. 7 is a side view of the detached signaling device. Figs. 7$^A$, 7$^B$, 7$^C$ and 7$^D$, are enlarged detail views of the signaling end of the device showing the adjustable signaling arm in its different positions, with Fig. 7$^D$ being a section on the line A—A of Fig. 7$^C$ looking in the direction of the arrows. Figs. 8, 9, 10, 11, 12, 12$^A$, 12$^B$, 13, 14 and 15 are detail views of the controlling cylinder and its parts, Fig. 12 being a section on the line B—B Fig. 10 looking in the direction of the arrows, and Fig. 13 being a section on the line A—A Fig. 9 looking in the direction of the arrows. Figs. 16, 17, 18, 19, 20, 20$^B$, 20$^C$, 20$^D$, 21, 22 and 23 are detail views of the signaling end cylinder and its parts, Fig. 20 being a section on the line B—B Fig. 18 looking in the direction of the arrows and Fig. 21 being a section on the line A—A Fig. 17 looking in the direction of the arrows. Fig. 20$^A$ is a sectional view showing the construction of piston head in each cylinder. Figs. 24, 24$^A$, 24$^B$, 24$^C$, 24$^D$, 25, 26 and 27 are detail views of the inner portion of the signaling arm and its parts, Fig. 26 being a section on the line A—A Fig. 24 looking in the direction of the arrows. Figs. 28, 29, 30, 31, 32, 33, 34, 35 and 36 are detail views of the outer portion of the signaling arm and its parts, Fig. 29 being a section on the line A—A Fig. 28 looking in the direction of the arrows, and Fig. 31 being a section on the line B—B Fig. 28 looking in the direction of the arrows.

Like symbols of reference herein indicate like parts in each of the figures of the drawing.

As illustrated in the drawing my improved signaling device for vehicles is shown as applied to an ordinary approved form of an automobile A, and consists mainly of a controlling end B' and a signaling end B'', each of which is provided with a fluid operated cylinder 1 and 3 respectively, and connected together and at each end of each of said cylinders by a line of tubes or pipes 2, which are connected to threaded openings $d$ and L in the cylinder heads $a$ and I respectively and carry the operating fluid. Each of the cylinders 1 and 3 has a piston therein composed of the two piston heads 3', which are connected by a piston rod, and each of which has a rack O and $g$ respectively, upon the top surface of the same for engaging quadrant pinions N and $f$, respectively, while said heads have disks $h$ and $i$ provided with tongue and groove members $m$ and $t$ which form on the periphery of said disks a stuffing box $n$. The racks O and $g$ each rest upon supports W and $o$ respectively, which are each placed immediately below the center of its quadrant pinion N and $f$ respectively, and in such manner as to prevent the rack springing away from its pinion in operation.

Each of the cylinders 1 and 3 is provided with suitable projections M and e to form a receptacle for housing the quadrant pinions N and f respectively, and such cylinders are provided with the projections J and b for securing such respective cylinders to the vehicle by suitable connections through the holes K and c in said projections J and b, while such projections M and e are each provided with a detachable face plate M' which may readily be removed for placing, cleaning or repairing the quadrant pinions N and f, as well as the bearings for the trunnions Y and Z for the pinion N and the trunnions q and r for the pinion f.

The pinion N has a square end x projecting beyond the face of the housing M for engaging with the operating lever 6 and the pinion f has a square end p which engages with the inner portion or piece 4 of the indicating arm.

The projection or housing e on the cylinder 3 has a projecting collar or neck t' from which extends a rigid shoulder, s, and the projecting collar or neck t' on said housing fits around the annular projection j on the piece 4 and is provided with an annular extension u which forms an annular groove v. The portion or piece 4 of the indicating or signaling arm is formed as a receptacle or housing for a chain and sprocket wheel connection as hereinafter described, and is provided with a face plate 4' which may be removed for placing, cleaning or repairing such connection. The plate 4' and the other plate forming the portion or piece 4 are provided with the square socket h' formed by the projecting surface j' which engages with the square end p of the pinion f, and a socket formed by the projecting surface e' provides a bearing for the trunnion end e'' of the sprocket wheel a'. The portion 4 is also provided with an annular extension i' and recess h' and the housing e of the cylinder 3 is provided with an annular extension u and groove v, said extension being adapted to fit into said recess h' and the extension i' being adapted to fit into the groove v. The portion 4 is provided with an annular extension f' which fits within the groove m' on the arm piece 5, while the extension l' on said piece 5 fits within the recess g' on the portion 4 and plate 4', and the parts are thus prevented from separating when operated in turning said piece on the portion 4.

Contained within the portion or piece 4 is a sprocket-chain c' which is attached at its ends to a rigid shoulder s on the end t' by a link connection d'. With the body of such chain engaging with the sprockets a'' and operating the sprocket-wheel a', turnbuckles d'' are employed in said chain to provide proper adjustment and tension to the same, while such wheel in being operated by said chain engages its trunnion end c'' within the bearing e' and its square end b' within a socket o' in the arm portion or piece 5. This arm portion or piece 5 of the indicating or signaling arm is a flat plate provided with a stiffening rib n' on its outer surface, and with the annular extension l', groove m' and square socket o' on its opposite surface, while at the outer end of said arm piece is placed a lamp for use at night, and an oil lamp is shown in Figs. 28 to 36 inclusive, in which w' is the body, x' is the lens, z' is the glass at the rear, and z'' the oil container. The lamp end of the arm piece 5 is shown as having a detachable end p', which is secured to the said piece by a suitable means q', while the parts s', t', u', v' and y' constitute a ball bearing arrangement to provide an easy means for the lamp to remain in a vertical position regardless of the position of the indicating or signaling arm.

In the installation and operation of my improved signaling device for vehicles, the controlling end B' consisting of the cylinder 1 and operating lever 6 is placed in the body of the vehicle A to which it is to be attached and at a point convenient of access by the driver, and as shown such cylinder is placed beneath the body of the vehicle and such lever placed within the body of the vehicle, although it is obvious that these parts or devices can be placed at any other point of convenient access by the driver and the operation remain the same. The operating lever 6 in extending up from the pinion N is adapted to move along a curved bar A' having a rack B by means of a guide F and is provided with a handle H at the upper end of the same, while a locking bar E controlled by a spring D is connected to the said lever to hold such lever in its desired position by means of a pin or dog C engaging with said rack, and such bar is operated by a handle G located above the lever handle H.

The indicating or signaling end B'' consisting of the cylinder 3 and the movable arm made up of the portions or pieces 4 and 5 is placed upon that portion of the vehicle from which the signal is to be seen, and as shown such signal end B'' is placed at the top and front of the radiator of the automobile A shown, although any other acceptable location on the vehicle would not impair its operation. These two parts of the device—the controlling end B' and signaling end B'', being connected by the pipes 2 and such pipes being filled with any suitable fluid such as oil or water, as well as the spaces in the cylinders 1 and 3 beyond the piston heads 3' therein, the device is ready for operating, so that by moving the lever 6 forward or backward a corresponding movement will be given to the piston in the cylinder 1 through the quadrant N, engaging rack O in said cylinder, and by such movement the liquid in such pipes is moved accordingly. By such movement of the liquid in the pipes 2, the piston in the cylinder 3 will respond therewith, and thus operate the movable signaling arm composed of the portions or pieces 4 and 5, through the medium of the quadrant $f$ engaging with the rack $g$ in said cylinder 3 and such quadrant being adapted to operate the chain $c'$ and wheel $a'$. With the operating lever 6 pushed forward the movable signaling arm rests in a position of complete extension with both portions or pieces 4 and 5 of the same in a horizontal plane or line, as shown in Fig. 7$^c$, while partly reversing said lever will reverse said arm so that said portions or pieces will assume a vertical position as shown in Fig. 7$^A$, and with such lever pushed or pulled completely back such arm by such portions or pieces would rest in a position of complete extension opposite to that shown in Fig. 7$^c$. It is evident also that the portions 4 and 5 composing the movable signaling arm can be moved by the lever 6 to other positions between its vertical and horizontal positions, such as is shown in Fig. 7$^B$. It will thus be seen that the signal device can be controlled by the driver from his seat in the vehicle, and the signal can be set by the driver, independent of the operation of the vehicle, so as to point to the right, left or vertical position. It will thus allow the driver approaching a corner where he wishes to turn to the right or left to set his signal accordingly at some distance from the corner, in which position it will remain with no further attention until he desires to again change his course of travel, and when such signal is set in a vertical position it will indicate that the driver is going straight ahead. It will also be seen that with the signal so set the driver has the free use of both hands and feet for other purposes and when he blows his horn or rings his bell, as is now required, persons hearing his alarm can recognize at once upon seeing his signal the direction he intends going, and thereby govern themselves accordingly, without the danger of being run into by the vehicle unexpectedly using the same crossing they intend to use, or being uselessly delayed in their movements by not readily knowing the direction the driver intends taking.

It will further be obvious that the traffic cornerman hearing the alarm of the horn or bell on the vehicle can tell at a glance the direction the driver desires to go and at once get him into line with the moving traffic, which will thus avoid many useless delays of the vehicle and enable such corner man to more readily regulate traffic and avoid congestion, as such signal device is always indicating the direction the driver desires to go, such as in pointing to the right, or to the left, or in a vertical position to indicate going straight ahead, while for night signaling the lamp at the outer end of the signaling arm can be suitably colored so as to be readily distinguished from the fixed lamps.

My improved signaling device can be applied to automobiles, trucks and various other kinds of vehicles, and various modifications and changes in the construction, design, application and operation of the device may be resorted to without departing from the spirit of the invention or sacrificing any of its advantages.

What I claim as my invention and desire to secure by Letters Patent is:—

1. A signaling device for vehicles comprising a support, an arm rockably mounted on said support, a second arm rockably connected with said first arm, means for rocking said first named arm, and connection means carried by said first named arm, between said rocking means and said second named arm, for causing the said second named arm to rock relatively to said first named arm, when the latter is rocked relatively to said support.

2. A signaling device for vehicles comprising a support, an arm rockably mounted on said support, a second arm rockably connected with said first named arm, means for rocking the said first named arm, connection means, carried by said first named arm, between said rocking means and said second named arm, for causing said second named arm to rock relatively to said first named arm when the latter is rocked relatively to said support, an actuating device, and controlling means between said actuating device and said rocking means.

3. In a signaling device for vehicles, a support, an arm rockably mounted on said support, a second arm rockably mounted on said first named arm, connecting means between said arms to cause said second named arm to rock relatively to said first named arm when said first named arm is rocked on said support, a piston, means associated with said piston for rocking said first named arm, a double-ended cylinder for receiving said piston, a second double-ended cylinder having the ends thereof connected with the ends of said first named cylinder, a piston in said second named cylinder, and actuating means for said piston.

4. A signaling device for vehicles including a fluid controlling means, a cylinder, an element movable in the cylinder, an extensible arm carried by the cylinder, said arm consisting of a plurality of pivotally united sections and means contained within the sections and connected to the said element and cylinder for swinging the extensible arm with respect to the cylinder upon the movement of said element.

5. A signaling device for vehicles including a fluid controlling means, a cylinder, an element movable in the cylinder, an extensible arm carried by the cylinder, said arm consisting of a plurality of pivotally united sections and means contained within the sections and connected to the said element and cylinder for swinging the extensible arm with respect to the cylinder upon the movement of said element, said means being also operable for swinging the sections with respect to each other when the arm is swung.

6. A signaling device for vehicles including a cylinder, a piston movable therein, an arm rockably mounted on said cylinder, an extension pivotally connected with said arm, and means carried by said arm and connected to said piston for swinging said arm and simultaneously moving said extension about its pivot when said piston is moved in said cylinder.

7. A signaling device for vehicles including a cylinder, a piston movable therein, an extensible arm mounted on the cylinder, said arm consisting of hollow pivotally united sections, and means movable within the arm and connected to the piston and cylinder for extending the arm and swinging the same into horizontal position upon movement of the piston.

8. A signaling device for vehicles including a cylinder, means supplying an operating fluid thereto, a piston movable within the cylinder, an extensible arm consisting of hollow pivotally united sections, means movable within the sections whereby the movement of one section causes a corresponding movement of the other section, and means controlled by the piston for actuating said last mentioned means.

9. A signaling device for vehicles comprising a cylinder, a piston movable therein, a pinion controlled by the piston, an arm rockably mounted on said cylinder and rigidly connected with said pinion, a second arm pivoted on said first named arm and having a pinion concentric with its pivot, and connection means between said second-named pinion and said cylinder to cause said second named arm to rock relatively to said first-named arm when the latter is rocked about its pivot.

In testimony whereof, I the said WILLIAM P. EARNHEART, have hereunto set my hand.

WILLIAM P. EARNHEART.

Witnesses:
ELLA M. HERTZOG,
CHARLES ALCON.